3,255,272
OLEFIN DIMERIZATION

Kenneth L. Lindsay, Baton Rouge, La., assignor to Ethyl Corporation, New York, N.Y., a corporation of Virginia
No Drawing. Filed Aug. 30, 1961, Ser. No. 134,838
8 Claims. (Cl. 260—683.15)

The present invention is concerned with the dimerization of olefins, especially the dimerization of propylene to produce 4-methylpentene-1.

Many techniques have been employed for dimerizing olefinic materials to produce different longer chain olefins. The alkali metals have been especially effective as catalysts for dimerization at various conditions of temperature and pressure. These alkali metal catalyzed procedures have been particularly employed with regard to the dimerization of propylene to produce 4-methylpentene-1, a product which is quite useful in enhancing the octane properties of a hydrocarbon fuel or for polymerization to result in a high-melting polymer useful in fibers, films, etc. By way of particular example, the dimerization of propylene employing the alkali metal, potassium, as a catalyst is described in recently issued U.S. Patent 2,986,558 (see also Belgian Patent 588,134). As indicated therein, the dimerization does occur, producing hexene products, especially 4-methylpentene-1 as a major component. Inherent in this technique, however, is the fact that the reaction rate is slow and that still a considerable amount of isomerization occurs to produce other less desirable isomers. Still further, it is well recognized that sodium metal, the most economical of all the alkali metals, is not employable because of the fact that esesntially no reaction occurs and, to the extent that any reaction occurs, isomerization primarily results with essentially no 4-methylpentene-1 in the product mixture. Further, the conversions and catalyst utilization leave something to be desired. Others have indicated procedures for the dimerization of olefins wherein certain promoters for the alkali metal catalysts are employed, namely the polynuclear aromatic hydrocarbons (note Freed U.S. 2,492,693). Still others have employed the use of certain supports for the alkali metal such as carbon (U.S. Patent 2,881,234) and in this instance, the proportion of 4-methylpentene-1 obtained in the dimerization product has been shown to be essentially negligible. Finally, others have employed the use of aminated alkali metal on supports such as alumina for dimerization, especially of propylene, and here also the proportion of 4-methylpentene-1 obtained in the hexene fraction is indicated to be esesntially negligible (Union of South Africa Patent 60/4,511).

Because of these inherent deficiencies in the prior art procedures, the alkali metal dimerization technique has not been employed on a commercial scale. It is, however, quite desirable to effect the dimerization of olefins, especially propylene, in a more efficient and practical manner in order that these materials can be made economically available for their many diverse uses.

Accordingly, an object of this invention is to provide a new and novel process for the dimerization of olefins. A particular object is to provide a process whereby olefins are dimerized at a faster rate, more selectively, and at greater conversions with a minimization of isomerization of the resulting product to a less desirable olefin. Still further objects are to overcome the above and other deficiencies of the prior art procedures of alkali metal dimerization. A specific object is to provide a more effective, selective, and improved method for dimerizing propylene than known heretofore. Other objects will be evident as the discussion proceeds.

The above and other objects of this invention are accomplished by heating an olefin in the presence of a catalyst comprising an alkali metal and a hydroxide of a metal selected from the group consisting of alkali metals having an atomic number of 19 to 55, inclusive, and barium. The olefins are generally straight chain having from 3 up to and including about 8 carbon atoms with propylene being especially preferred. Of the alkali metals, potassium is particularly preferred and employed in conjunction with potassium hydroxide. It has been found that the hydroxide activates and promotes the dimerization reaction more selectively, e.g. in the case of propylene to 4-methylpentene-1. The temperature which is employed is preferably of the order of 150 to 200° C. with pressures being between 300 to 1500 p.s.i. Likewise, the proportion of the hydroxide promoter employed is preferably between about 10 to 30 percent by weight of the total weight of the alkali metal and the hydroxide employed as catalyst. By way of example of an especially preferred embodiment of this invention, propylene is heated in the presence of a minor amount of about 2.5 percent by weight, based on the total weight of catalyst and propylene, of a catalyst consisting of a mixture of potassium and potassium hydroxide in a ratio of 5 parts of the former to 1 part by weight of the latter at 150 to 200° C. and 300 to 1500 p.s.i. to produce 4-methylpentene-1.

The process of the present invention has many unique advantages over the prior art procedures for dimerizing olefins. By way of example, a faster rate of dimerization is accomplished by virtue of incorporation of the designated hydroxides in the catalyst system. It has been found that higher yields and conversions are obtained in shorter periods of time for producing the desired olefin. Indeed, not only does the system promote the dimerization to a greater extent than those systems previously known, but it also minimizes the undesirable effect of isomerization of the double bond, that is, moving the double bond from one position to another. More spectacular is the advantage that even the most economical sodium metal can be employed as the alkali metal to produce the desired olefin product in high yield, conversion, and rate of reaction. A still further advantage attributable to the instant catalyst system is that the stringent requirements of an essentially anhydrous system need not be employed. Thus, one need not employ rigidly anhydrous reagents and conditions according to the present invention. These and other advantages will be evident as the discussion proceeds.

The alkali metals which are employed in the catalyst include those metals of Group I-A of the Periodic Chart of the Elements, e.g. lithium, sodium, potassium, rubidium, and cesium. The metal can be in any form as, for example, lumps, bars, ribbon, or the like, since in most instances it becomes molten under the reaction conditions. Of the alkali metals, sodium and potassium are particularly preferred because of greater economy and their greater effectiveness.

The hydroxide employed as an essential constituent of the catalyst system is a hydroxide of an alkali metal having an atomic number of 19 to 55, inclusive, or a hydroxide of the metal barium. Thus, the hydroxides include potassium, rubidium, cesium, or barium hydroxide. It has been found that these hydroxides in conjunction with the above described alkali metals produce profound effects in the dimerization reactions. The hydroxides are employed in their readily available solid commercial forms, for example, as flakes, pelets, and the like. In order to effect better distribution and admixture of the hydroxide with the alkali metal, reduction in particle size is generally desirable. Thus, the hydroxide is preferably employed in a form in which it has an average particle size of 100 microns or less with the largest particle size being less than 500 microns in major dimension. Pulverized hydroxide or hydroxide in powdered form is particularly effective. Of the hydroxides, potassium hydroxide comprises an especially preferred embodiment. It in conjunction with sodium or potassium metal, especially the latter, has been found to be even more effective than the other alkali metal-alkali metal hydroxide combinations.

In general, any olefin can be dimerized according to the processing of the instant invention, especially those having from 3 up to about 3 carbon atoms. It is preferable that the olefin be a straight chain olefin, especially the alpha-olefins, since such are more readily dimerized to desirable products. Thus, among the olefins which are employed are included propylene, butene-1, butene-2, isobutylene, hexene-1, octene-1, and the like. Propylene comprises an especially preferred embodiment because of its ready availability and the unique benefits obtained when such is employed in conjunction with the catalyst system of this invention toward the production of 4-methylpentene-1.

The operational techniques are quite simple and can be varied. By way of example, all that one need do is add the alkali metal and the alkali metal hydroxide to a reactor, supported or unsupported, and pressurize the reactor with the olefin, e.g. propylene. If desired, solvents can be employed and added prior to pressurization of the olefin. The system is then heated to the desired reaction temperature, usually agitated, and maintained at these conditions until the reaction is essentially complete as indicated by the pressure drop. The reactor can then be vented to recover the olefin products and any unreacted olefin, if such be the case, can be recycled. Then, the reactor need only be again pressurized with the olefin and the cycle repeated numerous times without changing the catalyst. Alternatively, rather than employ the aforementioned batch and semi-continuous procedure, continuous procedures can be employed whereby the pressure is maintained by the continuous feeding of the olefin to the reactor with continuous withdrawal of the dimerized product therefrom for subsequent separation of the product and recycle of unreacted starting olefin. Other variations of batch, semi-continuous, or continuous operation will now be evident.

The present invention will be more readily understood from the following examples.

Example I

To a reactor equipped with internal agitation, external heating means, and a means for adding and discharging the reactants and products was added 5 grams of potassium metal and 1 gram of powdered potassium hydroxide. Then, 100 ml. of Nujol, a high boiling aliphatic hydrocarbon mixture of the mineral oil boiling range, was added to the reactor and heat applied to raise the temperature to about 135° C. Agitation was commenced and the reactor pressurized with 1.23 moles of propylene and heated to 179° C. and a pressure of 900 p.s.i.g. When the pressure had dropped to about 400 p.s.i.g., the reactor was vented and the product olefins analyzed. Then, the reactor was repressurized with propylene, without the addition of further or fresh catalyst, to repeat the cycle. Employing this technique, the following table illustrates the results obtained upon recharging with propylene at the end of each cycle.

TABLE I

| Temp., °C. | Residence Time (Hrs.) | Moles Propylene Fed | Moles $C_6$ Product | Moles $C_6$ Produced per Hr./Liter of Reactor | Composition of $C_6$ Product (Wt. Percent) | | | | |
|---|---|---|---|---|---|---|---|---|---|
| | | | | | $M_4P_1$ | $M_4P_2$ | $M_2P_1$ plus $H_1$ | $M_2P_2$ plus $Tr-H_2$ | Cis $H_2$ |
| 135–179 | 2.3 | 1.23 | .0637 | 0.1108 | 81.06 | 9.01 | 6.69 | 2.15 | 1.08 |
| 168–170 | 1.35 | 1.23 | .1519 | 0.4501 | 78.61 | 11.87 | 5.96 | 2.61 | 0.97 |
| 170–173 | 2.17 | 1.23 | .1990 | 0.2931 | 72.86 | 16.21 | 5.17 | 3.87 | 1.888 |
| 166–168 | 2.83 | 1.23 | .1618 | 0.2287 | 64.17 | 24.75 | 4.12 | 4.92 | 1.66 |
| 167–173 | 2.17 | 1.23 | .1461 | 0.2693 | 64.87 | 23.59 | 4.41 | 5.06 | 1.02 |
| 168–170 | 2.10 | 1.23 | .1102 | 0.2099 | 61.26 | 25.70 | 4.51 | 6.26 | 1.70 |

$M_4P_1$ = 4-methylpentene-1.
$M_4P_2$ = 4-methylpentene-2.
$M_2P_1$ = 2-methylpentene-1.
$H_1$ = Hexene-1.
$M_2P_2$ = 2-methylpentene-2.
$Tr-H_2$ = trans-hexene-2.
cis-H = cis-hexene-2.

Example II

The above run was repeated essentially as described with exception that in place of the Nujol, Bayol D, another mixture of saturated aliphatic hydrocarbons of high boiling range, was employed as the hydrocarbon diluent.

TABLE II

| Temp., °C. | Residence Time (Hrs.) | Moles Propylene Fed | Moles $C_6$ Product | Moles $C_6$ Produced per Hr./Liter of Reactor | Composition of $C_6$ Product (Wt. Percent) | | | | |
|---|---|---|---|---|---|---|---|---|---|
| | | | | | $M_4P_1$ | $M_4P_2$ | $M_2P_1$ plus $H_1$ | $M_2P_2$ plus $Tr-H_2$ | Cis $H_2$ |
| 176–181 | .9167 | 1.23 | .09434 | 0.4116 | 77.24 | 12.8 | 6.29 | 2.58 | 1.09 |
| 179–182 | .500 | 1.23 | .1468 | 1.1744 | 73.40 | 16.63 | 5.35 | 3.44 | 1.18 |
| 175–179 | .83 | 1.23 | .2408 | 1.1563 | 60.16 | 28.25 | 3.45 | 5.55 | 1.81 |
| 177–180 | .25 | 1.23 | .1170 | 1.872 | 59.30 | 27.36 | 4.05 | 6.38 | 1.92 |
| 173–180 | .5 | 1.30 | .1497 | 1.1796 | 58.71 | 27.09 | 4.63 | 6.69 | 2.08 |
| 175–182 | .5 | 1.30 | .1661 | 1.3288 | 60.47 | 26.42 | 4.01 | 6.49 | 1.87 |
| 175–180 | 1.33 | 1.30 | .0335 | 0.09937 | 48.94 | 27.60 | 5.18 | 13.22 | 1.83 |

Example III

Again employing the procedure of Example I with exception that the temperature and moles of propylene fed were charged as indicated, the following results were obtained.

TABLE III

| Temp., °C. | Residence Time (Hrs.) | Moles Propylene Fed | Moles C₆ Product | Moles C₆ Produced per Hr./ Liter of Reactor | Composition of C₆ Product (Wt. Percent) | | | | |
|---|---|---|---|---|---|---|---|---|---|
| | | | | | $M_4P_1$ | $M_4P_2$ | $M_2P_1$ plus $H_1$ | $M_2P_2$ plus $Tr-H_2$ | Cis $H_2$ |
| 176–188 | 1.25 | 1.16 | 0.1197 | 0.3830 | 78.17 | 11.63 | 6.37 | 2.60 | 1.11 |

By way of unique illustration of the advantages and unusual characteristics of the present invention, the following example is presented.

Example IV

This run was conducted essentially the same as in Example I with exception that in place of potassium, sodium metal was employed in equal amount by weight. All other conditions are as indicated.

TABLE IV

| Temp., °C. | Residence Time (Hrs.) | Moles Propylene Fed | Moles C₆ Product | Moles C₆ Produced per Hr./ Liter of Reactor | Composition of C₆ Product (Wt. Percent) | | | | |
|---|---|---|---|---|---|---|---|---|---|
| | | | | | $M_4P_1$ | $M_4P_2$ | $M_2P_1$ plus $H_1$ | $M_2P_2$ plus $Tr-H_2$ | Cis $H_2$ |
| 175–180 | 1.66 | 1.23 | .00831 | 0.0200 | 82.04 | 6.78 | 8.25 | 2.11 | 0.79 |
| 180–182 | 1.92 | 1.15 | .1004 | 0.2092 | 75.61 | 13.21 | 5.85 | 3.99 | 1.33 |
| 178–181 | 2.117 | 1.15 | .1813 | .3426 | 62.32 | 25.15 | 3.10 | 6.63 | 2.03 |
| 178 | 1.917 | 1.15+ | .1928 | .4023 | 45.97 | 39.24 | 2.35 | 8.68 | 2.26 |
| 177–180 | 1.62 | 1.23 | .1422 | .3511 | 50.19 | 34.92 | 2.75 | 8.45 | 2.32 |
| 154–179 | 3 | 1.15 | .1254 | .1672 | 42.69 | 36.55 | 3.52 | 13.71 | 2.19 |
| 178–179 | 3.92 | 1.23 | .1215 | .1240 | 30.86 | 42.73 | 3.76 | 19.72 | 1.69 |

Thus, the above example illustrates the very unique situation wherein even with sodium metal, a material which in the past has been ineffective for propylene dimerization, high conversions to 4-methylpentene-1 as well as a very high proportion of 4-methylpentene-1 in the C₆ products is obtained. Indeed, to further contrast the results of the above example, an essentially identical run was attempted wherein the catalyst comprised 2 g. of sodium hydroxide mixed with 5 g. of sodium, all other conditions being essentially the same, with the residence time of 5 hours. In this instance, no propylene dimerization was obtained.

In further contrast to the unique results in the above illustrative examples, when potassium is employed alone, slower rates and lower conversions are obtained with a lower proportion of 4-methylpentene-1 in the product and indeed a pronounced reduction is obtained in the conversion of the propylene to hexenes from the first to the second cycle.

Example V

The procedure of Example I was again repeated essentially as described with exception that in place of propylene, butene was employed as the olefin and only one cycle was performed.

TABLE V

| Temp., °C. | Residence Time (Hrs.) | Pressure, p.s.i.g. | | Product |
|---|---|---|---|---|
| | | Max. | Min. | |
| 174–185 | 8 | 1,000 | 550 | Mixture of octenes—major portion 5-methyl-2-heptene and 3,4-dimethyl-1-hexene. |

Example VI

When Example I is repeated employing 2.5 parts of potassium hydroxide in conjunction with 5 parts by weight of potassium, 4-methylpentene-1 is again obtained in good yield at a high conversion rate.

Example VII

Again employing the procedure of Example I with exception that an equivalent amount of sodium was substituted for the potassium and an equivalent amount of n-heptane was substituted for the Nujol, the following table reflects the remaining conditions and the results obtained.

TABLE VI

| Temp., °C. | Residence Time (Hrs.) | Moles Propylene Fed | Composition of C₆ Product (Wt. percent) | | |
|---|---|---|---|---|---|
| | | | $M_4P_1$ | $M_4P_2$ | $M_2P_1$ plus $H_1$ |
| 190–206 | 9 | 1.23– | 89.82 | 2.12 | 8.05 |

Example VIII

When Example I is repeated substituting rubidium hydroxide, cesium hydroxide, or barium hydroxide for potassium hydroxide and cesium for potassium, equally good results are obtained.

The above examples have been presented by way of illustration and it is not intended to be limited thereto. It will now be evident that other alkali metals in combination with the designated metal hydroxides and olefins can be substituted.

As indicated in the above discussion, the process can be conducted under a variety of conditions. Generally, the temperature which is employed is between about 100 to 250° C. Lower temperatures are employable, however, the rate and conversion are correspondingly reduced. Higher temperatures are to be avoided since some product degradation will occur, catalyst life is shortened, and isomerization results. It has been found that the best results with regard to rate of reaction, yield minimization of isomerization, and the like are obtained at temperatures between about 150 to 200° C. and therefore this range is especially preferred. Likewise, the pressure employed is variable and in general pressures of the order of atmospheric or super-atmospheric are employed. As the pressure is increased, the rate generally is further increased. For best operation, it has been found that pressures between about 300 to 1500 p.s.i. should be employed.

The proportion of the catalyst used to the amount of olefin employed can be varied. As indicated by the above examples, as many as 10 and more cycles of pressurization of the reactor with the olefin can be affected so that thus only a minor quantity of the catalyst is necessary. Ordinarily, between 1 to 10 percent by weight of catalyst based upon the total weight of catalyst and starting olefin is employed with best results obtained at between 2 to 5 percent by weight of the catalyst. The proportion of the alkali metal to the hydroxide is generally of the order of 1 to 50 percent by weight of the hydroxide based upon the total weight of the alkali metal and the hydroxide. As a practical matter, best results are obtained with regard to enhancement of reaction rate and production of the desired product when employing between 10 and 30 percent by weight of the hydroxide based on the total weight of the catalyst mixture.

The starting materials which are employed need not be subjected to any particular pre-treatment such as further purification, and the like. For example, the starting olefin, alkali metal, and metal hydroxide are generally employed in their form as commercially available. The olefin can thus have other essentially inert constituents present therein, such as saturated hydrocarbons and the like. It is preferable that both the olefin and the metal hydroxide be essentially anhydrous in order to avoid unnecessary reactivity with the alkali metal. However, the normal amount of moisture contained in commercial grades of the olefin and solid metal hydroxides is not deleterious to the beneficial effects and results of the present invention.

As indicated by the above examples, generally the process is conducted in the presence of a solvent. While solvents are not required, they do facilitate heat control, contact of the reactants, and additionally provide a means for having the olefin in solution for greater reactivity. For these purposes, the usual essentially inert organic solvents can be employed. The hydrocarbons have been found to be particularly effective. Among the criteria of choice of the solvents is that they be essentially inert and liquid under the reaction conditions employed. Likewise, it is desirable that they exhibit solubility for the olefin starting reagent. Thus, typical examples of solvents to be employed are the saturated aliphatic hydrocarbons, e.g. hexane, octane, nonane, decane, isooctane, decalin, cycloheptane, and mixtures as, or example, kerosene, mineral oil, and the like. It is preferable that the solvent employed be higher boiling, that is, that it have a boiling point at least 20° C. higher than the boiling point of the olefin product. It is also preferred that the solvent have a boiling point or a boiling point range above about 200° C. for ease of handling and separation from the reaction mixture. Mineral oil, such as Nujol or Bayol-D, comprises a particularly preferred solvent.

The olefin mixture produced according to the process of the instant invention can be employed for various uses as obtained directly from the reaction mixture, such as flashing from the reactor, continuous withdrawal, and the like. If it is desired to separate the mixture into its components to obtain more pure material, such can be accomplished by conventional techniques such as, for example, fractional distillation, azeotropic distillation, and extractive distillation. By such techniques, for example, from propylene dimerization 4-methyl-pentene-1 can be obtained in greater purity for more effective use in polymerization and the other isomers having other uses, for example 2-methyl-2-pentene can be isolated for cracking to isoprene by known techniques.

The products produced according to the process of the present invention are of considerable utility. By way of example, the longer chain olefins can be employed as solvents for various organic compounds. They can also be employed as components for fuel mixtures, especially fuels of the gasoline boiling range for internal combustion engines. For example, when adding 4-methyl-pentene-1 to a typical motor fuel, an enhancement in the octane number is obtained. Another use for the olefin products obtained is for polymerization to produce polymeric materials. A particularly effective illustration of this utility is the polymerization of 4-methylpentene-1 in the presence of a catalyst comprising an organometallic, such as triethylaluminum or diethyl aluminum chloride, in combination with a refractory metal halide, such as vanadium tetrachloride, at temperatures of about 100 to 200° C. and elevated pressure to produce poly-4-methyl-pentene-1. This particular utility is illustrated in British Patents 808,144 and 849,553. These polymers are quite useful in forming fibers as illustrated by U.S. Patent 2,842,532, British Patent 823,309, and British Patent 835,759. Other uses for the products produced according to the instant process will now be evident.

Having thus described the novel process of this invention, it is not intended that it be limited except as set forth in the following claims.

I claim:
1. A process for dimerizing a straight chain olefin being characterized by having one double bond and from 3 up to about 8 carbon atoms which comprises heating said olefin at a temperature not in excess of 200° C. in contact with a catalyst consisting essentially of an alkali metal selected from the group consisting of sodium, potassium, rubidium, and cesium, and a hydroxide of a metal selected from the group consisting of alkali metals having an atomic number of 19 to 55, inclusive, and barium, said hydroxide being present in an amount between 1 to 50 percent by weight based on the total weight of said alkali metal and said hydroxide.

2. The process of claim 1 wherein said olefin is propylene.

3. The process of claim 1 wherein the reaction is conducted at a temperature between about 150 to 200° C.

4. The process of claim 3 further characterized in that the catalyst consisting essentially of potassium metal in admixture with potassium hydroxide, said potassium hydroxide being present in the mix in amount between about 10 to 30 percent by weight.

5. The process of claim 3 further characterized in that the catalyst consisting essentially of sodium metal in admixture with potassium hydroxide, said potassium hydroxide being present in the mix in amount between about 10 to 30 percent by weight.

6. The process of claim 3 wherein the reaction is conducted in the presence of a liquid, saturated, aliphatic hydrocarbon.

7. The process for the manufacture of 4-methylpentene-1 which comprises contacting propylene with a catalyst consisting essentially of potassium and potassium hydroxide at a temperature between about 150 to 200° C. and a pressure between about 300 to 1500 p.s.i., said potassium hydroxide being present in amount between about 10 to 30 percent by weight based upon the total weight of said potassium and potassium hydroxide.

8. The process for the manufacture of 4-methylpentene-1 which comprises contacting propylene with a catalyst consisting essentially of sodium and potassium hydroxide at a temperature between about 150° to 200° C. and a pressure between about 300 to 1500 p.s.i., said potassium hydroxide being present in amount between about 10 to 30 percent by weight based upon the total weight of said sodium and potassium hydroxide.

References Cited by the Examiner

UNITED STATES PATENTS 2,466,694  4/1949  Freed _____ 260—683.15
2,881,234  4/1959  Esmay et al. _____ 260—683.15

(Other references on following page)

UNITED STATES PATENTS

| | | | |
|---|---|---|---|
| 2,986,588 | 5/1961 | Schramm | 260—683.15 |
| 3,087,978 | 4/1963 | Wilson et al. | 260—683.15 |
| 3,095,461 | 6/1963 | Wilkes | 260—683.15 |
| 3,185,745 | 5/1965 | Lindsay | 260—683.15 |
| 3,207,812 | 9/1965 | Hambling et al. | 260—683.15 |

OTHER REFERENCES

Remy, "Treatise on Inorganic Chemistry," published by Elsevier Pub. Co., Amsterdam (1956), vol. 1, page 175 relied on.

PAUL M. COUGHLAN, *Primary Examiner.*

ALPHONSO D. SULLIVAN, *Examiner.*